US009175768B2

United States Patent
Jeong et al.

(10) Patent No.: US 9,175,768 B2
(45) Date of Patent: Nov. 3, 2015

(54) SYSTEM AND METHOD OF CONTROLLING TRANSMISSION FOR VEHICLE

(71) Applicants: Hyundai Motor Company, Seoul (KR); Kia Motors Corporation, Seoul (KR)

(72) Inventors: Dong Hoon Jeong, Osan-si (KR); Byeong Wook Jeon, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 90 days.

(21) Appl. No.: 14/141,331

(22) Filed: Dec. 26, 2013

(65) Prior Publication Data

US 2015/0019093 A1    Jan. 15, 2015

(30) Foreign Application Priority Data

Jul. 11, 2013   (KR) .......................... 10-2013-0081602

(51) Int. Cl.
| *F16H 61/14* | (2006.01) |
|---|---|
| *F16H 61/68* | (2006.01) |
| *F16H 59/72* | (2006.01) |
| *F16H 59/66* | (2006.01) |

(52) U.S. Cl.
CPC .............. *F16H 61/68* (2013.01); *F16H 61/143* (2013.01); *F16H 59/72* (2013.01); *F16H 2059/663* (2013.01); *F16H 2312/00* (2013.01)

(58) Field of Classification Search
CPC .............................. F16H 61/68; F16H 2312/00
See application file for complete search history.

(56) References Cited

U.S. PATENT DOCUMENTS

| 5,101,350 | A  | * | 3/1992 | Tokoro | ............................ 701/57 |
| 2001/0000338 | A1 | * | 4/2001 | IIJima | ............................. 477/62 |
| 2004/0229728 | A1 | * | 11/2004 | Oshima et al. | ................ 477/176 |
| 2014/0172256 | A1 | * | 6/2014 | Landes et al. | .................. 701/65 |

FOREIGN PATENT DOCUMENTS

| JP | 2005-76768 A | 3/2005 |
| JP | 2007-154943 B2 | 6/2007 |
| KR | 1020060053652 A | 5/2006 |
| KR | 1020090056163 A | 6/2009 |

* cited by examiner

*Primary Examiner* — Edwin A Young
(74) *Attorney, Agent, or Firm* — Morgan, Lewis & Bockius LLP

(57) ABSTRACT

A system and a method of controlling a transmission for a vehicle can protect the transmission by controlling an oil temperature in the transmission when driving on a long uphill road. The system may include: an engine generating driving torque; a transmission converting and outputting the driving torque generated at the engine; a lock-up clutch disposed between the engine and the transmission, and directly coupling the engine to the transmission selectively; a data detector detecting data for controlling the transmission; and a controller determining whether a long uphill road condition is satisfied based on the data, determining whether a protective logic operating condition is satisfied if the long uphill road condition is satisfied, and operating a protective logic if the protective logic operating condition is satisfied.

13 Claims, 4 Drawing Sheets

"prior art"

SYSTEM AND METHOD OF CONTROLLING TRANSMISSION FOR VEHICLE

CROSS-REFERENCE TO RELATED APPLICATION

The present application claims priority of Korean Patent Application Number 10-2013-0081602 filed Jul. 11, 2013, the entire contents of which application is incorporated herein for all purposes by this reference.

BACKGROUND OF INVENTION

1. Field of Invention

The present invention relates to a system and a method of controlling a transmission for a vehicle. More particularly, the present invention relates to a system and a method of controlling a transmission for a vehicle that can protect the transmission by controlling an oil temperature in the transmission when driving on a long uphill road.

2. Description of Related Art

An automatic transmission predicts a driver's will and performs a shift automatically according to the predicted driver's will. A vehicle where the automatic transmission is mounted is provided with a torque converter disposed between an engine and the automatic transmission. The torque converter increases torque of the engine hydraulically and delivers the increased torque to the automatic transmission. Since the torque converter transmits the torque hydraulically, power delivery efficiency may be low.

To solve such problems, the torque converter is provided with the lock-up clutch. The lock-up clutch delivers the torque of the engine to the automatic transmission without torque multiplication by directly coupling the engine to the automatic transmission at a region where power delivery efficiency of the torque converter is poor.

Generally, when the vehicle provided with the automatic transmission runs on an uphill road, the lock-up clutch is released and the vehicle drives using torque multiplication effect of the torque converter for securing drivability. However, if the vehicle drives on a long uphill road, heat energy is excessively generated by hydraulic friction, and thus the oil temperature of the automatic transmission rises to a threshold temperature or higher. At this time, the lock-up clutch is engaged and hydraulic friction is reduced for protecting the automatic transmission.

FIG. 4 shows a conventional method of controlling a transmission when a vehicle provided with an automatic transmission runs on a long uphill road.

As shown in FIG. 4, when the vehicle provided with the automatic transmission enters the long uphill road during running at a seventh forward speed, a controller releases the lock-up clutch and maintains a shift-speed to be the seventh forward speed. In this case, since the lock-up clutch is released, the oil temperature of the automatic transmission rises due to the hydraulic friction.

If the oil temperature of the automatic transmission rises to a threshold temperature or higher, the controller engages the lock-up clutch so as to prevent rise of the oil temperature. Since torque multiplication effect vanishes if the lock-up clutch is engaged, torque transmitted from the engine to the automatic transmission is reduced.

Therefore, the automatic transmission lowers the shift-speed so as to assist the torque. That is, the shift-speed is lowered from the seventh forward speed to a sixth forward speed or a fifth forward speed.

If the conventional method of controlling the transmission is applied, the automatic transmission may be protected to a certain degree but it is difficult to prevent rise of the oil temperature. Since the shift is performed on the uphill road, shift feel may be deteriorated.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a system and a method of controlling a transmission for a vehicle having advantages of protecting the transmission by predicting a long uphill road ahead of the vehicle and controlling the oil temperature when the vehicle runs on the predicted long uphill road.

Various aspects of the present invention provide for a system of controlling a transmission for a vehicle that may include: an engine generating driving torque; a transmission converting and outputting the driving torque generated at the engine; a lock-up clutch disposed between the engine and the transmission, and directly coupling the engine to the transmission selectively; a data detector detecting data for controlling the transmission; and a controller determining whether a long uphill road condition is satisfied based on the data, determining whether a protective logic operating condition is satisfied if the long uphill road condition is satisfied, and operating a protective logic if the protective logic operating condition is satisfied.

The lock-up clutch may be controlled to directly couple the engine to the transmission and the transmission may be controlled to lower a shift-speed in the protective logic.

The long uphill road condition may be satisfied if an altitude difference between a current position and a first preceding position positioned ahead from the current position by a first predetermined distance is greater than or equal to a first predetermined altitude difference, and a length of a region between the current position and the first preceding position, gradient of which is smaller than a first predetermined gradient, is shorter than a first predetermined length.

The protective logic operating condition may be satisfied if a vehicle speed is slower than a predetermined vehicle speed, an engine torque is higher than a predetermined torque, and an oil temperature is higher than a first predetermined oil temperature.

The controller may determine whether a protective logic release condition is satisfied during the protective logic is operated, and may release the protective logic if the protective logic release condition is satisfied and the oil temperature is lower than a second predetermined oil temperature.

The protective logic release condition may be satisfied if an altitude difference between the current position and a second preceding position ahead from the current position by a second predetermined distance is smaller than a second predetermined altitude difference, or a length of a region between the current position and the second preceding position, gradient of which is smaller than a second predetermined gradient, is longer than or equal to a second predetermined length.

Whether the long uphill road condition is satisfied may be determined only when preceding information that is map information of a region ahead from the current position exists.

The controller may release the protective logic if the preceding information does not exist, the protective logic is operated, and gradient is smaller than a third predetermined gradient.

A method of controlling a transmission for a vehicle according to various aspects of the present invention is configured to control the transmission that is directly coupled to an engine through a lock-up clutch or hydraulically receives torque of the engine.

The method may include: detecting data for controlling the transmission; determining whether preceding information exists based on the data; determining whether a long uphill road condition is satisfied if the preceding information exists; determining whether a protective logic operating condition is satisfied if the long uphill road condition is satisfied; and operating the protective logic if the protective logic operating condition is satisfied.

The lock-up clutch may directly couple the engine to the transmission and the transmission may lower a shift-speed if the protective logic is operated.

The long uphill road condition may be satisfied if an altitude difference between a current position and a first preceding position positioned ahead from the current position by a first predetermined distance is greater than or equal to a first predetermined altitude difference, and a length of a region between the current position and the first preceding position, gradient of which is smaller than a first predetermined gradient, is shorter than a first predetermined length.

The protective logic operating condition may be satisfied if a vehicle speed is slower than a predetermined vehicle speed, an engine torque is higher than a predetermined torque, and an oil temperature is higher than a first predetermined oil temperature.

The method may further include: determining whether a protective logic release condition is satisfied during the protective logic is operated; determining whether the oil temperature is lower than a second predetermined oil temperature if the protective logic release condition is satisfied; and releasing the protective logic if the oil temperature is lower than the second predetermined oil temperature.

The protective logic release condition may be satisfied if an altitude difference between the current position and a second preceding position ahead from the current position by a second predetermined distance is smaller than a second predetermined altitude difference, or a length of a region between the current position and the second preceding position, gradient of which is smaller than a second predetermined gradient, is longer than or equal to a second predetermined length.

The method may further include: determining whether the protective logic is operated if the preceding information does not exist; determining whether gradient is smaller than a third predetermined gradient if the protective logic is operated; and releasing the protective logic if the gradient is smaller than the third predetermined gradient.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
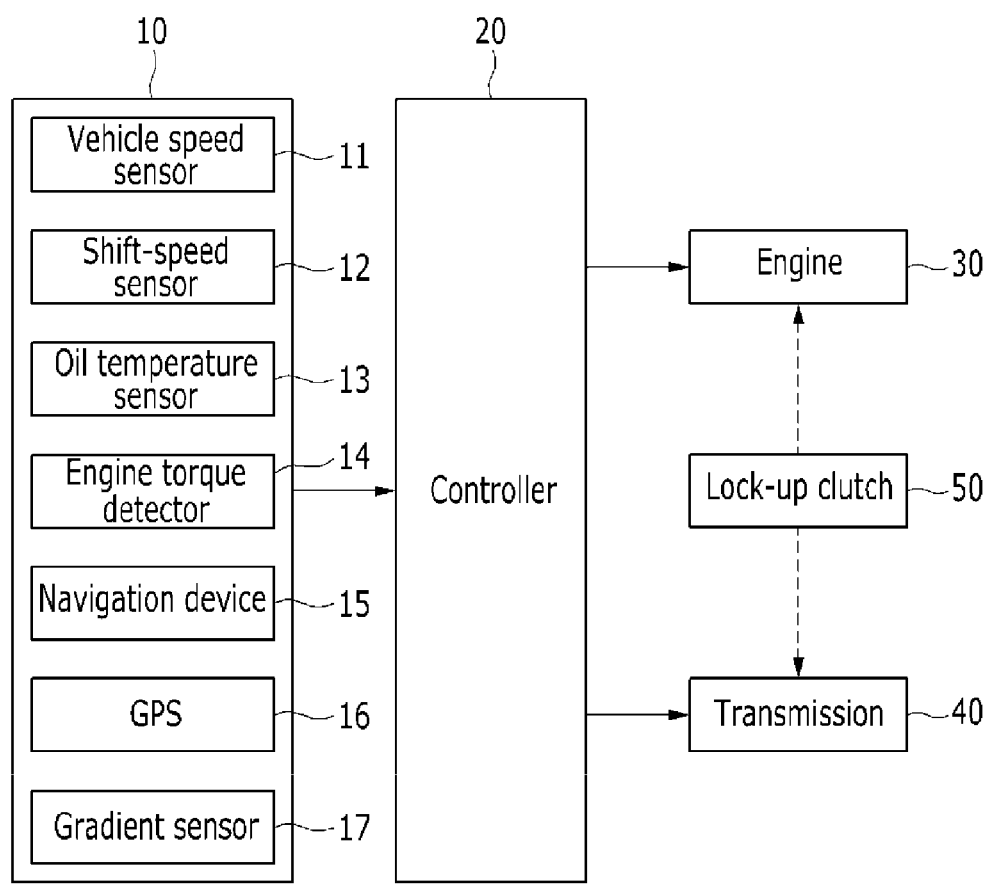
FIG. 1 is a block diagram of an exemplary system of controlling a transmission for a vehicle according to the present invention.

FIG. 1 is a block diagram of a system of controlling a transmission for a vehicle according to various embodiments of the present invention.

As shown in FIG. 1, a system of controlling a transmission for a vehicle according to various embodiments of the present invention includes a data detector 10, a controller 20, an engine 30, a transmission 40 and a lock-up clutch 50.

The data detector 10 detects data for controlling the transmission, and the data detected by the data detector 10 is transmitted to the controller 20. The data detector 10 includes a vehicle speed sensor 11, a shift-speed sensor 12, an oil temperature sensor 13, an engine torque detector 14, a navigation device 15, a global positioning system (GPS) 16 and a gradient sensor 17.

The vehicle speed sensor 11 detects a vehicle speed, and is mounted at a wheel of the vehicle. On the contrary, the vehicle speed may be calculated based on a GPS signal received by the GPS 16.

The shift-speed sensor 12 detects a shift-speed that is currently engaged.

The oil temperature sensor 13 detects a temperature of transmission oil used in the transmission.

The engine torque detector 14 detects engine torque. The engine torque may be detected by a sensor, or calculated using control variables of the engine such as the vehicle speed, a position of an acceleration pedal, an engine speed, a fuel injection amount, and etc.

The navigation device 15 is a device which informs the driver of a route to a destination. The navigation device 15 includes an input/output portion inputting or outputting information for guidance of the route, a current position detecting portion detecting information on a current position of the vehicle, a memory in which a map data for calculating the route and a data for guiding the route are stored, and a control portion for searching the route and performing guidance of the route. The map data includes gradient and altitude at each point. Meanwhile, the map data including the gradient and the altitude at each point can be transmitted from an information center to the navigation device 15 via wireless or wire communication.

The GPS 16 receives a signal transmitted from a GPS satellite and transmits a signal corresponding thereto to the navigation device 15. The navigation device 15 can calculate a current position of the vehicle based on the signal.

The gradient sensor 17 detects gradient of a road on which the vehicle runs currently. As described above, the gradient at each point of the road is included in the map data, but the gradient sensor 17 is additionally mounted in the vehicle so as to detect the gradient of the road on which the vehicle runs currently. The gradient sensor 17 enables the control method of various embodiments to be executed even though the vehicle runs on the road, the map data of which does not exist.

The controller 20 is electrically connected to the vehicle speed sensor 11, the shift-speed sensor 12, the oil temperature sensor 13, the engine torque detector 14, the navigation device 15, the GPS 16 and the gradient sensor 17. The controller 20 determines whether preceding information exists, whether a long uphill road condition is satisfied, whether a protective logic operating condition is satisfied, or whether a protective logic release condition is satisfied based on the data detected by the data detector 10. For these purposes, the controller 20 can be realized by one or more processors activated by a predetermined program, and the predetermined program can be programmed to perform each step of a method of controlling a transmission for a vehicle according to various embodiments of the present invention.

Hereinafter, referring to FIG. 2, a method of controlling a transmission for a vehicle according to various embodiments of the present invention will be described in detail.

Figure 2:
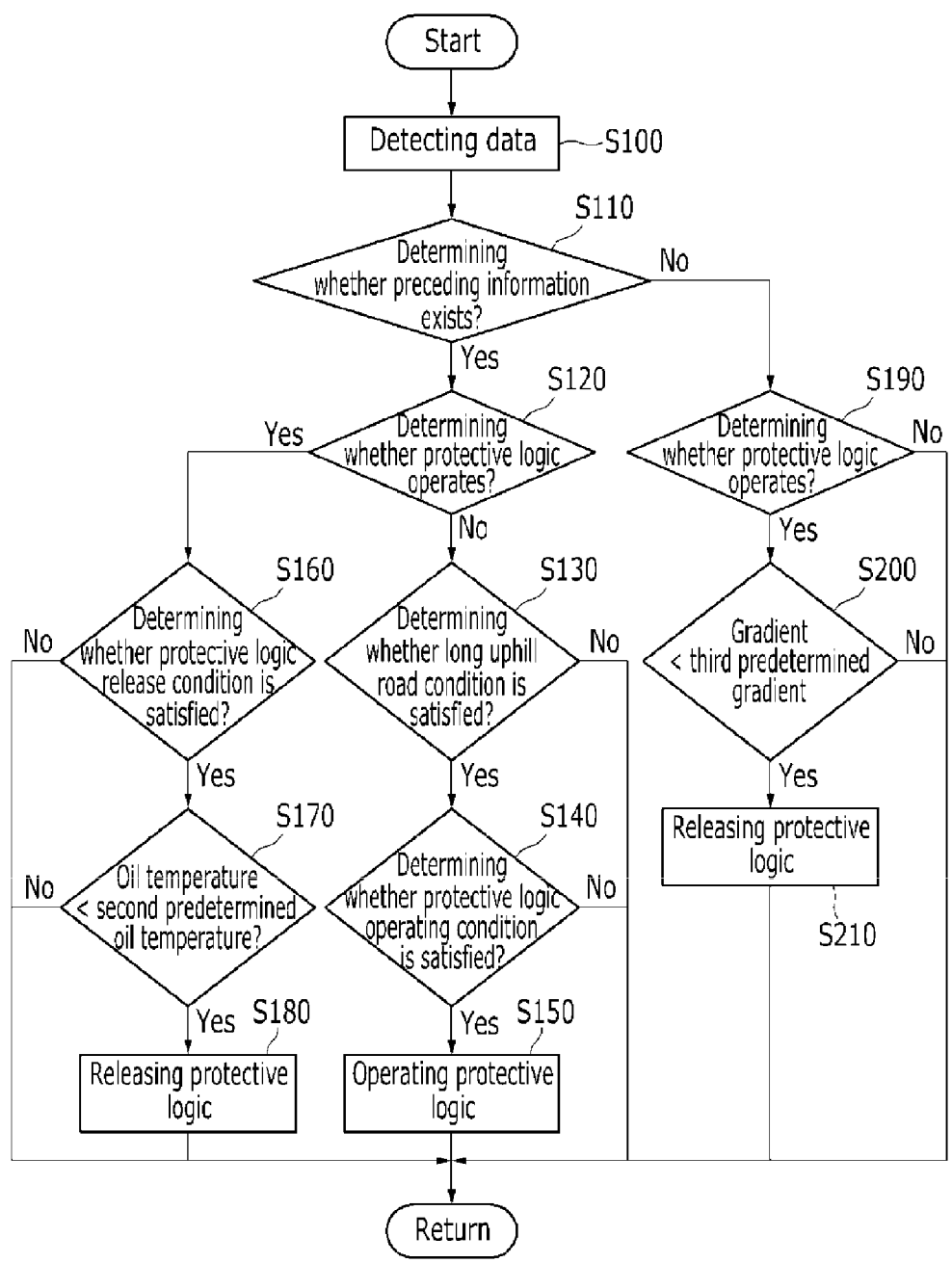
FIG. 2 is a flowchart of an exemplary method of controlling a transmission for a vehicle according to the present invention.

FIG. 2 is a flowchart of a method of controlling a transmission for a vehicle according to various embodiments of the present invention.

As shown in FIG. 2, a method of controlling a transmission for a vehicle according to various embodiments of the present invention begins with detecting the data at step S100.

That is, the vehicle speed sensor 11 detects the vehicle speed, the shift-speed sensor 12 detects the shift-speed that is currently engaged, the oil temperature sensor 13 detects the temperature of the transmission oil in the transmission, the engine torque detector 14 detects the engine torque, the navigation device 15 reads the map data, the GPS 16 detects signal of the GPS satellite, and the gradient sensor 17 detect the gradient of the road on which the vehicle runs currently.

If the data detector 10 detects and transmits the data to the controller 20, the controller 20 determines whether the preceding information that is the map data of a region ahead of the current vehicle position exists at step S110. The preceding information includes the altitude and the gradient at each point ahead of the vehicle and a distance from the current position to each point.

If the preceding information exists at the step S110, the controller 20 determines whether the protective logic is operated at step S120. In addition, the controller 20 also determines whether the protective logic is operated at step S190 if the preceding information does not exist at the step S100. Although whether the protective logic is operated is determined at both steps S120 and S190, the step S120 is for operating the protective logic if the protective logic is not operated and the step S190 is for releasing the protective logic if the protective logic is operated.

If the protective logic is not operated at the step S120, the controller 20 determines whether the long uphill road condition is satisfied at step S130. That is, the controller 20 determines whether the vehicle will run on the substantially long uphill road. Herein, the long uphill road condition may be satisfied if an altitude difference between the current position and a first preceding position positioned ahead from the current position by a first predetermined distance is greater than or equal to a first predetermined altitude difference, and a length of a region between the current position and the first preceding position, gradient of which is smaller than a first predetermined gradient, is shorter than a first predetermined length. That is, if the length of the region having a gentle gradient between the current position and the first preceding position, the altitude difference therebetween being larger than or equal to the first predetermined altitude difference, is shorter than the first predetermined length, the road is determined to be a long sloped road (i.e., long uphill road). Meanwhile, the first predetermined distance, the first predetermined altitude difference, the first predetermined gradient and the first predetermined length may be set by a person of an ordinary skill in the art according to types of transmissions, types of transmission oils and so on.

If the long uphill road condition is not satisfied at the step S130, the controller 20 finishes the control method according to various embodiments. After that, the controller 20 begins with the step S100 again.

If the long uphill road condition is satisfied at the step S130, the controller 20 determines whether the protective logic operating condition is satisfied at step S140. The protective logic operating condition may be satisfied if the vehicle speed is slower than a predetermined vehicle speed, an engine torque is higher than a predetermined torque, and the oil temperature is higher than a first predetermined oil temperature. Herein, the vehicle speed and the engine torque are used for determining whether a release condition of the lock-up clutch 50 is satisfied, and the engine torque and the oil temperature are used for determining whether the temperature of the transmission oil can excessively rise. That is, since the lock-up clutch 50 can be released and the oil temperature can rise excessively if the vehicle speed is slow and the engine torque is high, the lock-up clutch 50 is not released if the vehicle will run on the long uphill road.

If the protective logic operating condition is not satisfied at the step S140, the controller 20 finishes the control method according to various embodiments. After that, the controller 20 begins with the step S100 again.

If the protective logic operating condition is satisfied at the step S140, the controller 20 operates the protective logic at step S150. If the protective logic is operated, the lock-up clutch 50 is engaged so as to directly couple the engine 30 to the transmission 40, and a target shift-speed that is lower than a current shift-speed is engaged. The target shift-speed is determined by the controller 20 according to the length of the uphill road, the gradient of the uphill road and so on.

After that, the controller 20 finishes the control method according to the various embodiments and begins with the step S100 again.

If the protective logic is operated at the step S120, the controller 20 determines whether the protective logic release condition is satisfied at step S160. The protective logic release condition may be satisfied if an altitude difference between the current position and a second preceding position ahead from the current position by a second predetermined distance is smaller than a second predetermined altitude difference, or a length of a region between the current position and the second preceding position, gradient of which is smaller than a second predetermined gradient, is longer than or equal to a second predetermined length. That is, if the region having smaller altitude difference exists ahead of the vehicle or the length of the region having smaller gradient is longer than or equal to the second predetermined length, it is determined that the road is not the long uphill road. Herein, the second predetermined distance, the second predetermined altitude difference, the second predetermined gradient and the second predetermined length may be set by a person of an ordinary skill in the art according to types of transmissions, types of transmission oils and so on. In addition, the second predetermined distance may be shorter than the first predetermined distance, and the second predetermined altitude difference may be smaller than the first predetermined altitude difference. The second predetermined gradient and the second predetermined distance may be set regardless of the first predetermined gradient and the first predetermined length, respectively.

If the protective logic release condition is not satisfied at the step S160, the controller 20 finishes the control method according various embodiments and begins with the step S100 again.

If the protective logic release condition is satisfied at the step S160, the controller 20 determines whether the oil temperature is lower than a second predetermined oil temperature at step S170. That is, even though the protective logic release condition is satisfied, the protective logic is not released if the oil temperature is high.

If the oil temperature is higher than or equal to the second predetermined oil temperature at the step S170, the controller 20 finishes the control method according to various embodiments and begins with the step S100.

If the oil temperature is lower than the second predetermined oil temperature at the step S170, the controller 20 releases the protective logic at step S180. After that, the controller 20 finishes the control method according to various embodiments and begins with the step S100.

If the protective logic is not operated at the step S190, the controller 20 finishes the control method according to various embodiments and begins with the step S100.

If the protective logic is operated at the step S190, the controller 20 determines whether the gradient is smaller than a third predetermined gradient at step S200. That is, if the gradient of the road on which the vehicle currently runs is small, the protective logic is released.

If the gradient is greater than or equal to the third predetermined gradient at the step S200, the controller 20 finishes the control method according to various embodiments and begins with the step S100 again.

If the gradient is smaller than the third predetermined gradient at the step S200, the controller 20 releases the protective logic at step S210. After that, the controller 20 finishes the control method according to various embodiments and begins with the step S100.

Figure 3:
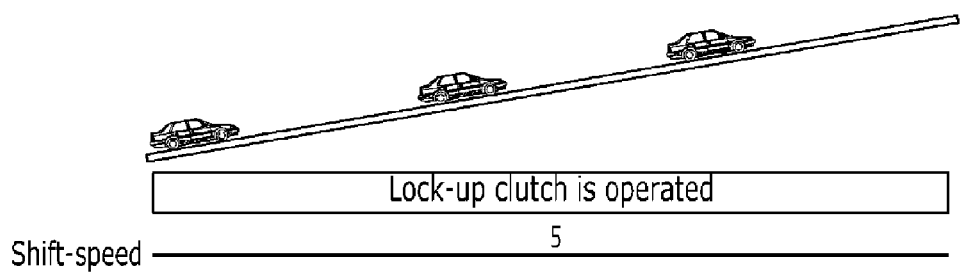
FIG. 3 shows an exemplary method of controlling a transmission according to the present invention when a vehicle provided with an automatic transmission runs on a long uphill road.
Figure 4:
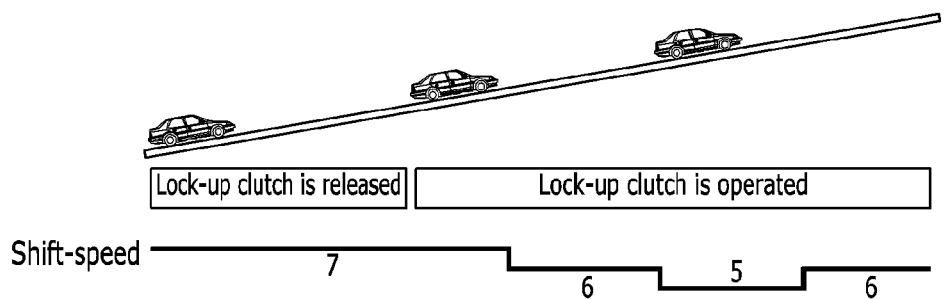
FIG. 4 shows a conventional method of controlling a transmission when a vehicle provided with an automatic transmission runs on a long uphill road.

FIG. 3 shows a method of controlling a transmission according to various embodiments of the present invention when a vehicle provided with an automatic transmission runs on a long uphill road.

As shown in FIG. 3, if the vehicle having the system according to various embodiments of the present invention enters the long uphill road during running at a seventh forward speed, the controller 20 determines whether the protective logic should be operated. If the protective logic should be operated, the controller 20 engages the lock-up clutch 50 so as to directly couple the engine 30 to the transmission 40. In addition, the controller 20 calculates the target shift-speed (fifth forward speed) that is the lower than the current shift-speed (seventh forward speed) according to the length and the gradient of the uphill road, and the vehicle enters the long uphill road at the target shift-speed, that is the fifth forward speed. After that, the controller 20 maintains the target shift-speed. Therefore, it is prevented that the transmission oil is overheated.

As described above, the long uphill road is predicted in advance and rise of the oil temperature is prevented when the vehicle runs on the long uphill road according to various embodiments of the present invention. Therefore, the transmission may be protected.

In addition, since the number of shifts can be minimized, drivability may be secured.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system of controlling a transmission for a vehicle comprising:
an engine generating driving torque;
a transmission converting and outputting the driving torque generated at the engine;
a lock-up clutch disposed between the engine and the transmission, and directly and selectively coupling the engine to the transmission;
a data detector detecting data for controlling the transmission; and
a controller determining whether a long uphill road condition is satisfied based on the data, determining whether a protective logic operating condition is satisfied if the long uphill road condition is satisfied, and operating a protective logic if the protective logic operating condition is satisfied,
wherein the long uphill road condition is satisfied if an altitude difference between a current position and a first preceding position positioned ahead from the current position by a first predetermined distance is greater than or equal to a first predetermined altitude difference, and a length of a region between the current position and the first preceding position, gradient of which is smaller than a first predetermined gradient, is shorter than a first predetermined length.

2. The system of claim 1, wherein the lock-up clutch is controlled to directly couple the engine to the transmission and the transmission is controlled to lower a shift-speed in the protective logic.

3. The system of claim 1, wherein the protective logic operating condition is satisfied if a vehicle speed is slower than a predetermined vehicle speed, an engine torque is higher than a predetermined torque, and an oil temperature is higher than a first predetermined oil temperature.

4. The system of claim 1, wherein the controller determines whether a protective logic release condition is satisfied during the protective logic is operated, and releases the protective logic if the protective logic release condition is satisfied and an oil temperature is lower than a second predetermined oil temperature.

5. The system of claim 4, wherein the protective logic release condition is satisfied if an altitude difference between the current position and a second preceding position ahead from the current position by a second predetermined distance is smaller than a second predetermined altitude difference, or a length of a region between the current position and the second preceding position, gradient of which is smaller than a second predetermined gradient, is longer than or equal to a second predetermined length.

6. The system of claim 1, wherein whether the long uphill road condition is satisfied is determined only when preceding information that is map information of a region ahead from the current position exists.

7. The system of claim 6, wherein the controller releases the protective logic if the preceding information does not exist, the protective logic is operated, and the gradient of the length of the region between the current position and the first preceding position is smaller than a third predetermined gradient.

8. A method of controlling a vehicle transmission that is directly coupled to an engine through a lock-up clutch or hydraulically receives torque of the engine, the method comprising:
   detecting data for controlling the transmission;
   determining whether preceding information exists based on the data;
   determining whether a long uphill road condition is satisfied if the preceding information exists;
   determining whether a protective logic operating condition is satisfied if the long uphill road condition is satisfied; and
   operating the protective logic if the protective logic operating condition is satisfied,
   wherein the long uphill road condition is satisfied if an altitude difference between a current position and a first preceding position positioned ahead from the current position by a first predetermined distance is greater than or equal to a first predetermined altitude difference, and a length of a region between the current position and the first preceding position, gradient of which is smaller than a first predetermined gradient, is shorter than a first predetermined length.

9. The method of claim 8, wherein the lock-up clutch directly couples the engine to the transmission and the transmission lowers a shift-speed if the protective logic is operated.

10. The method of claim 8, wherein the protective logic operating condition is satisfied if a vehicle speed is slower than a predetermined vehicle speed, an engine torque is higher than a predetermined torque, and an oil temperature is higher than a first predetermined oil temperature.

11. The method of claim 8, further comprising:
   determining whether a protective logic release condition is satisfied during the protective logic is operated;
   determining whether an oil temperature is lower than a second predetermined oil temperature if the protective logic release condition is satisfied; and
   releasing the protective logic if the oil temperature is lower than the second predetermined oil temperature.

12. The method of claim 11, wherein the protective logic release condition is satisfied if an altitude difference between the current position and a second preceding position ahead from the current position by a second predetermined distance is smaller than a second predetermined altitude difference, or a length of a region between the current position and the second preceding position, gradient of which is smaller than a second predetermined gradient, is longer than or equal to a second predetermined length.

13. The method of claim 8, further comprising:
   determining whether the protective logic is operated if the preceding information does not exist;
   determining whether the gradient of the length of the region between the current position and the first preceding position is smaller than a third predetermined gradient if the protective logic is operated; and
   releasing the protective logic if the gradient is smaller than the third predetermined gradient.

* * * * *